US008810603B2

(12) United States Patent
Moody et al.

(10) Patent No.: US 8,810,603 B2
(45) Date of Patent: Aug. 19, 2014

(54) CREATING IMAGES FOR DISPLAYING OR PRINTING ON LOW-CONTRAST BACKGROUND

(75) Inventors: Jay T. Moody, Wayland, MA (US); Shawn M. Mears, Marlborough, MA (US); Terence M. Tirella, Winchester, MA (US); Mark P. LaRosa, Melrose, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 932 days.

(21) Appl. No.: 12/021,083

(22) Filed: Jan. 28, 2008

(65) Prior Publication Data

US 2009/0189913 A1 Jul. 30, 2009

(51) Int. Cl.
*G09G 5/00* (2006.01)

(52) U.S. Cl.
USPC .......................................... 345/660; 345/443

(58) Field of Classification Search
None
See application file for complete search history.

(56) References Cited

U.S. PATENT DOCUMENTS

| 4,994,854 | A | * | 2/1991 | Miyamoto ....................... 399/85 |
| 5,311,336 | A | * | 5/1994 | Kurita et al. ................... 358/538 |
| 5,757,384 | A | * | 5/1998 | Ikeda et al. .................... 345/468 |
| 5,872,897 | A | * | 2/1999 | Jones et al. ..................... 358/1.9 |
| 6,169,607 | B1 | * | 1/2001 | Harrington .................... 358/1.9 |
| 6,317,128 | B1 | * | 11/2001 | Harrison et al. .............. 345/629 |
| 6,377,240 | B1 | * | 4/2002 | Baudel et al. ................. 345/157 |
| 6,505,256 | B1 | | 1/2003 | York |
| 6,674,439 | B1 | * | 1/2004 | Shin et al. ..................... 345/501 |
| 7,796,139 | B1 | * | 9/2010 | Feierbach et al. ............. 345/589 |
| 2001/0012399 | A1 | * | 8/2001 | Tohyama et al. ............. 382/167 |
| 2001/0034668 | A1 | * | 10/2001 | Whitworth ...................... 705/27 |
| 2003/0063797 | A1 | * | 4/2003 | Mao .............................. 382/162 |
| 2003/0078931 | A1 | * | 4/2003 | Bevc et al. ...................... 707/10 |
| 2005/0275870 | A1 | * | 12/2005 | Elarde et al. ................. 358/1.15 |
| 2005/0281486 | A1 | * | 12/2005 | Jeffrey .......................... 382/309 |
| 2007/0120763 | A1 | * | 5/2007 | De Paepe et al. ............. 345/1.3 |
| 2007/0136685 | A1 | * | 6/2007 | Bhatla et al. .................. 715/800 |
| 2007/0136692 | A1 | * | 6/2007 | Seymour et al. .............. 715/835 |
| 2009/0146961 | A1 | * | 6/2009 | Cheung et al. ................ 345/172 |

FOREIGN PATENT DOCUMENTS

EP 0703698 A 3/1996

* cited by examiner

*Primary Examiner* — David H Chu
(74) *Attorney, Agent, or Firm* — Jessica Costa

(57) ABSTRACT

Techniques for automatically adding special effects to an image to be overlaid on a low-contrast background are presented. A stroke or an intervening layer of a color contrasting with the background color is automatically added to provide a contrasting color around the edges of visible image content in an image container of an electronic document. The technique may be applied to entire libraries of images to generate variant images that are visually perceptible when displayed or printed on low-contrast background colors.

20 Claims, 12 Drawing Sheets

CREATING IMAGES FOR DISPLAYING OR PRINTING ON LOW-CONTRAST BACKGROUND

FIELD OF THE INVENTION

This invention relates to displaying and printing of images, and more particularly to techniques for creating images to display or print over low-contrast backgrounds.

BACKGROUND OF THE INVENTION

Printing services Web sites often allow users to access the web site and customize a product with a graphical design. Typically, these printing services sites allow the user to first review uncustomized product images of the various products that are available from the provider, for example business cards, t-shirts, etc. When the user selects a specific product to customize, the sites typically provide online tools allowing the user to provide the text that the user desires to appear on the customized product. The user may also be allowed to either upload a full color image from the user's computer to be incorporated into the product design or to select from a number of decorative designs, images, and other graphic elements that are provided for the user's use by the printing services provider. Images of the user text entries and the user-selected decorative elements, collectively referred to herein as "design images" are combined with the basic product image to create a composite image indicating the appearance of the printed product. When the design is completed to the user's satisfaction, the user can place an order through the site for production of a desired quantity of the corresponding printed product.

Typically, a designer of a graphic design/image intends the image to be immediately visually perceived by those viewing the image. Visual perception is a function of luminence and contrast. As used herein, "luminence" is a photometric measure of the density of luminous intensity in a given direction. Luminance describes the amount of light that passes through or is emitted from a particular area, and falls within a given solid angle. "Contrast", as used herein, is the difference in visual properties that makes an object (or its representation in an image) distinguishable from other objects and the background. In visual perception of the real world, contrast is determined by the difference in the color and brightness of the object and other objects within the same field of view.

The appearance of an image may be affected by the color of the background on which it is displayed. Specifically, assuming sufficient luminence, if the contrast between the overall image and the background color is low, then the image may not be visually perceived in the manner that the designer intends. Thus, a designer of a graphical image typically designs the image with a specific background color or range of background colors in mind. For example, if the background color is going to be white or a light color, the designer of the image may incorporate mainly dark and/or bright colors, and may avoid or incorporate fewer light colors (including white), to make the image stand out against the white background. Similarly, if the background color is going to be a dark color such as black or navy, the designer of the image may incorporate mainly light and/or bright colors, and may avoid or incorporate fewer dark colors, to make the image stand out against the dark background. The appearance of a printed image is further affected by the degree of contrast between the background color on which the image is displayed or printed and areas of the image that abut the background. For example, an image having white areas that abut non-printed areas of a white t-shirt may not be as visually desirable as an image having only colored areas that abut non-printed areas of the t-shirt. Likewise, when the image to be printed includes areas of darker colors that are printed on a dark t-shirt, the effect of the image may not be as the designer of the image intends. This problem occurs whenever low-contrast colors are used in areas of an image that abut the background.

As illustrated by the preceding examples, it is challenging to create images that may be overlaid on a variety of background colors and still look good (i.e., which are still easily visually perceived by those viewing it). Printing service providers, both retail and online, often carry a large collection of designs that may be printed on various products. For the above described reasons, these designs typically look best when printed or displayed on a particular type of background color (e.g., white or light, or black or dark). However, when customers want to print or display a particular image over a background color that is not ideal to the design, then it is necessary to modify the images so that they can be visually perceived when printed or displayed on the selected background color.

At this time, there is currently no automated way of modifying an image to make it more visually perceptible when printed or displayed on a low-contrast background color. It would be desirable, however, to have such an automated process in order to allow the reuse of existing graphical design content for printing or displaying over a low-contrast background color. A need also exists for an automated technique for creating a set of variant designs/images, given an original design/image, each variant appropriate for printing or displaying on different respective background colors. A need further exists for an image management process which automatically keeps track of a variety of image versions created for different backgrounds and automatically selects the image version associated with a selected background upon selection of a particular background color.

SUMMARY OF THE INVENTION

Embodiments of the invention are directed to generating image variants of an image that are visually perceptible when printed or displayed on a low-contrast background.

In one embodiment, a computer-implemented method adds a stroke around image content in an image container of an electronic document by shrinking the visible image content contained within the image container while maintaining an original size of the image container, determining a stroke width based only on a smaller dimension of the height dimension and the width dimension of the image container, and adding a stroke characterized by the stroke width around the edges of the visible image content to produce a variant image comprising the shrunken visible image content and added stroke.

In an alternate embodiment, a computer-implemented method adds a stroke around image content in an image container of an electronic document by determining whether any of the visible image content abuts any edge of the image container, and if it is determined that any of the visible image content abuts any edge of the image container, shrinking the visible image content contained within the image container while maintaining an original size of the image container. The stroke width is then determined based on a size of the visible image content, and a stroke characterized by the stroke width is added around the edges of the visible image content to produce a variant image comprising the shrunken visible image content and added stroke.

BRIEF DESCRIPTION OF THE DRAWINGS

FIG. 8 is an image of a screen presented to a user of a product content management tool.

FIG. 9A is an image of a screen presented to a user of the product content management tool upon user selection of a product from the screen of FIG. 8.

FIG. 9B is an image of the screen of FIG. 9A presented to the user of the product content management tool upon user selection of a black substrate.

DETAILED DESCRIPTION

Figure 1A:
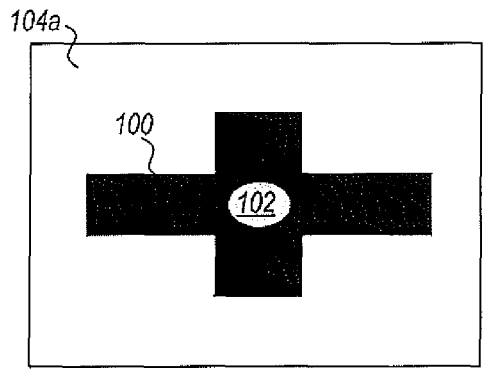
FIG. 1A is an image of a design overlaid on a light-colored background.

For a better understanding of the advantages conferred by various embodiments of the present invention described herein, an example illustration of the challenges of creating images that are visually distinct on backgrounds of different colors and contrast is first discussed. FIG. 1A illustrates an example design in the form of cross shape 100 with a transparent circle 102 in the center. The cross shape 100 is filled with a dark color (such as black), and is overlaid on a light-colored (such as white) background 104a.

Figure 1B:
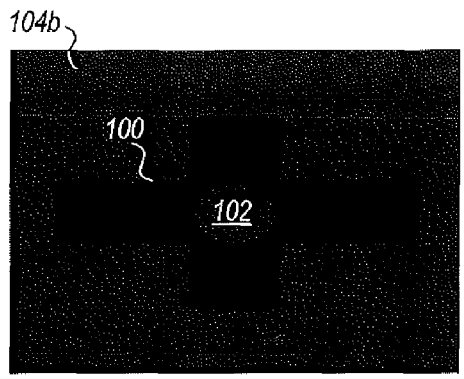
FIG. 1B is an image of the design of FIG. 1A against a dark background.
Figure 1C:
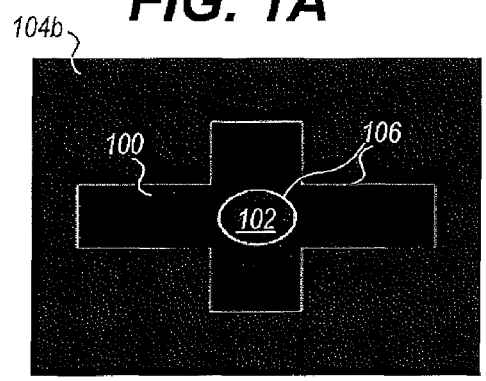
FIG. 1C is an image of the design of FIG. 1A with a line stroke applied to the edges of the visible image content and overlaid on a dark background.
Figure 1D:
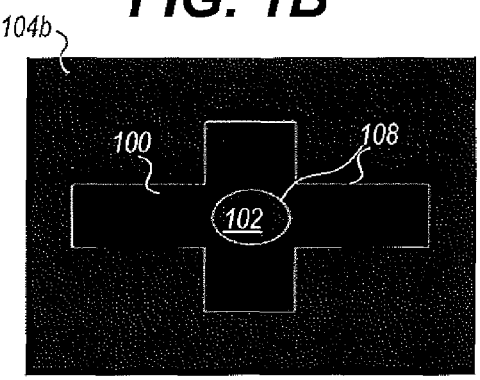
FIG. 1D is an image of the design of FIG. 1A with a feather stroke applied to the edges of the visible image content and overlaid on a dark background.
Figure 1E:
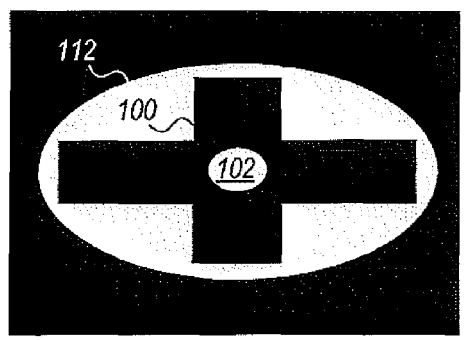
FIG. 1E is an image of the design of FIG. 1A with a contrasting background layer inserted under the visible image content and overlaid on a dark background.
Figure 1F:
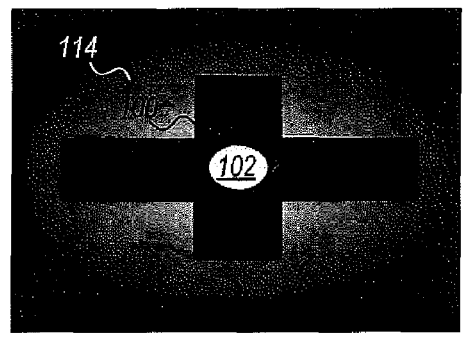
FIG. 1F is an image of the design of FIG. 1A with an intervening background layer inserted under the visible image content and overlaid on a dark background.

FIG. 1B illustrates the design of FIG. 1A against a dark background 104b, (for example, a black or navy background). As illustrated, the cross shape 100 is not visually perceptible against the dark background 104b. As FIG. 1B clearly illustrates, in order to allow the design 100 to be displayed or printed on any background color, the design 100 must be modified to include special effects for this purpose. The creation of special effects typically involves adding a visible border or other visible content at the edges of the visible design content in a design that border a transparent area in the design. For example, a solid white line (or other light-colored) stroke 106 may be applied around the edges of the cross shape design 100, as shown in FIG. 1C. The contrasting color of the stroke 106 against the dark background serves to delineate the edges of the cross shape 100 from the background, making the cross shape 100 visually perceptible even against a dark background. Note also that since the circle 102 is transparent, the edges of the cross shape abutting the transparent circle 102 are also stroked so that the center circle is also visually perceptible. FIG. 1D illustrates an alternative special effect in the form of a feathered stroke 108, which gives the appearance that there is more of a "glow" around the design 100. FIG. 1E illustrates an alternative special effect in the form of a contrasting background layer 112 inserted under the visible image content 100 and overlaid on a dark background 104b. FIG. 1F illustrates an alternative special effect in the form of an intervening background layer 114 inserted under the visible image content 100 and overlaid on a dark background 104b, wherein the intervening background layer comprises a gradient having a contrasting color in the center and fading out to a transparent. While examples of special effects are shown herein, they are presented herein only for the purposes of example and not limitation, and it will be appreciated that may other special effects may be similarly implemented to delineate a design from a low-contrast background.

Figure 2:
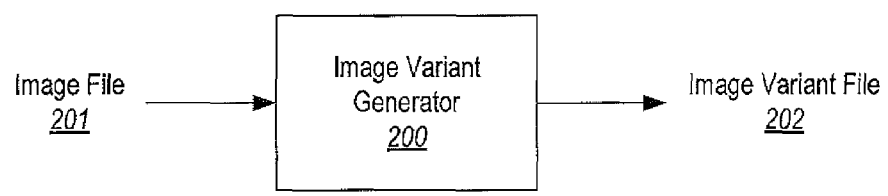
FIG. 2 is a block diagram of an image variant generator which generates a variant image file.

FIG. 2 illustrates generally an image variant generator 200 which processes an image file 201 containing an image into a variant image file 202 containing a variant of the image that is modified to include one or more special effects (such as those shown in FIGS. 1C-1F).

Figure 3:
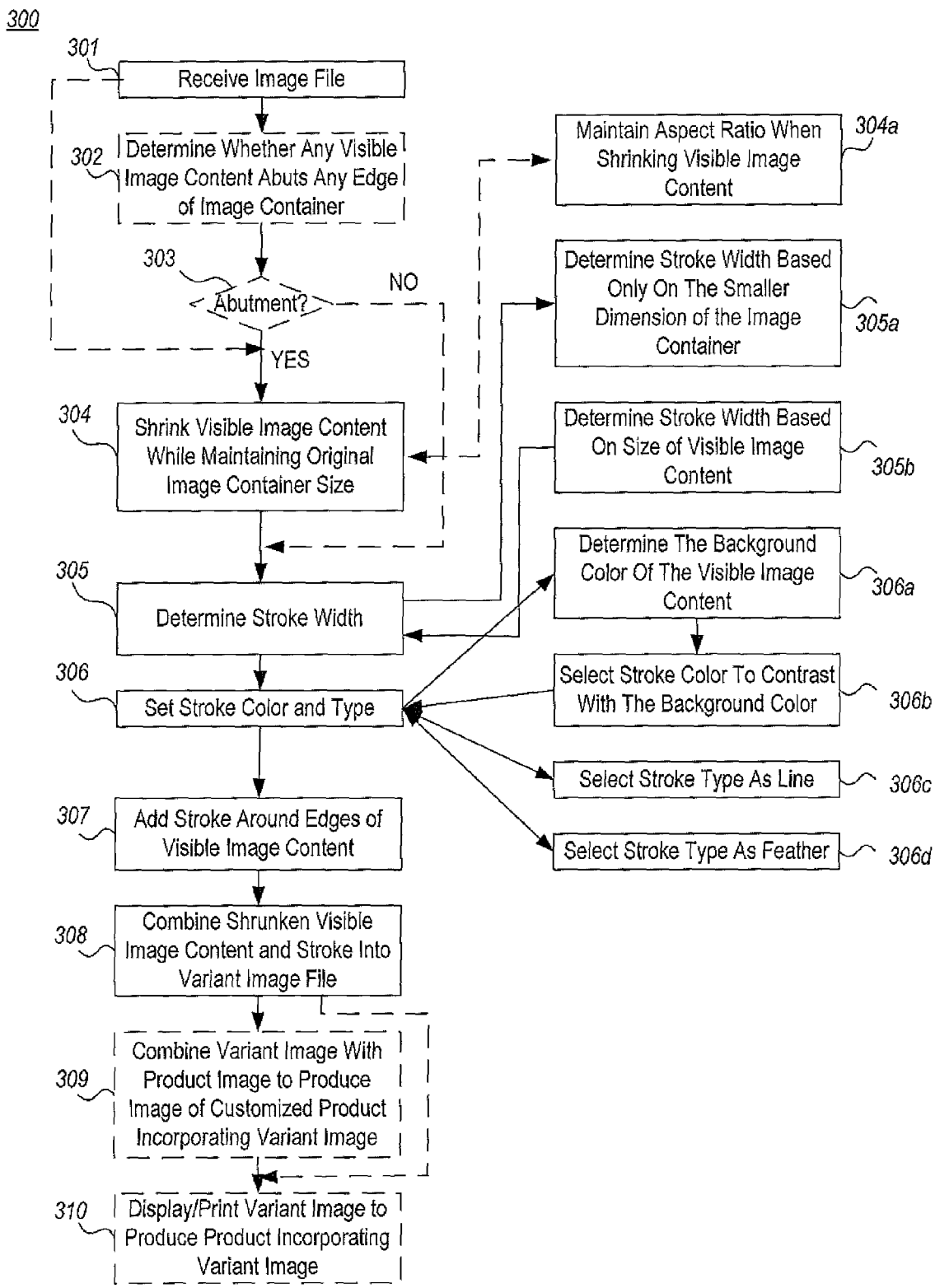
FIG. 3 is a flowchart of a method for adding special effects to an image to create a variant image that is visually perceptible over a low-contrast background.

FIG. 3 is a flow chart of a method performed by an exemplary embodiment of the image variant generator 200, and takes the form of a process 300 for adding a stroke effect to an image. The process 300 may be implemented as software code executing on a computer or other processor. In this embodiment image content is contained in an image container of an electronic document. An image container is characterized by height and width dimensions, and the ratio of the height to width of the image container is defined as the "aspect ratio" of the image container. The image container may comprise the entire displayed area of the electronic document, or may be defined as only a smaller portion of the electronic document. The visible image content of an image may be distributed in one or more visible layers in the image container. The image container may include one or more transparent layers.

The process 300 begins by receiving an image file containing an image (step 301). The image comprises an image container, one or more visible content layers having visible image content thereon, and zero or more transparent layers. In one embodiment, the process 300 determines whether any of the visible image content contained in the image container abuts any edge of the image container (step 302). If so, the process 300 shrinks the visible image content (i.e., image content on the visible content layers) to make room for a stroke effect to be added around all of the visible image content including the portions of the visible image content that abut the edge of the image container. The amount by which the visible image content is shrunk (i.e., reduced), is preferably a small fraction or percent of the size of the overall image content in order to prevent any significant change in the visual perception of the actual image content. For example, if it is known that the width of the stroke to be added around the visible image content will only be a few pixels in width, then the amount that the visible image content is reduced may only be such as to accommodate this number of pixels on each side of the image container. Preferably, the aspect ratio of the visible image content is maintained when shrinking the visible image content (step 304a).

In an alternative embodiment, the process 300 may automatically shrink the visible image content slightly to make room for a stroke effect regardless of whether any of the visible image content actually abuts any of the edges of the image container.

The process 300 continues by determining a stroke width (step 305). In one embodiment, the stroke width may be a set constant. For example, if it is known that all images are in image containers defined by a fixed height and width (or defined in terms of a fixed number of pixels), the stroke width may be set to a small percentage of the height or width. In one embodiment, the stroke width may be set based only on the smaller dimension of the image container (step 305a).

In another embodiment, the stroke width may be set based on the size of the visible image content (step 305b).

Continuing with the process 300 in FIG. 3, the stroke color and type are set (step 306). In an embodiment, the color of the stroke may be predetermined (e.g., always white, or always black) and will depend on the anticipated color of the background on which the image is to be displayed or printed. Generally, the predetermined color is selected to contrast with the anticipated background color. In another embodiment, the background color on which the image is to be displayed or printed is ascertained (step 306a) and then selected to contrast with the background color (step 306b). The stroke type may be set to a predetermined stroke, for example, a line stroke (step 306c) or a feather stroke (step 306d), or may be selected based on user input, a global flag, etc.

Once the stroke width, color, and type are set, the process adds the stroke around the edges of the visible image content (step 307). In an embodiment, this is achieved by outlining the visible image content with the stroke. In an alternative embodiment, the stroke effect is achieved by generating a visible object having the same shape and position as the visible image content but larger on every edge by the stroke width, filling the object with the selected stroke color, and placing the object layer underneath all of the visible image content. The shrunken visible image content and stroke effect are combined into a single variant image (step 308), which may be further combined with an image of a product to generate an image of a customized product that incorporates the variant image (step 309). The variant image may additionally or alternatively be displayed or printed on a product to produce a product customized with the variant image (step 310).

Alternative processes may be implemented as the image variant generator 200, such as processes to add a contrasting intervening background layer as in FIG. 1E or a contrasting color to transparent gradient intervening background layer as in FIG. 1F.

Figure 4A:
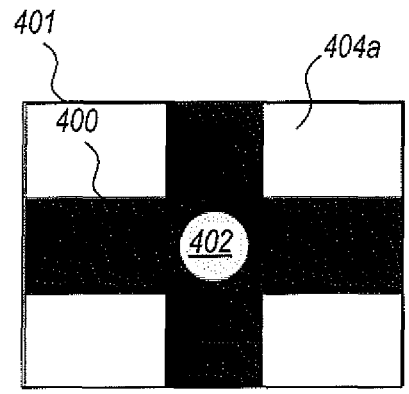
FIG. 4A is an image of a design which abuts the edges of the image container.
Figure 4B:
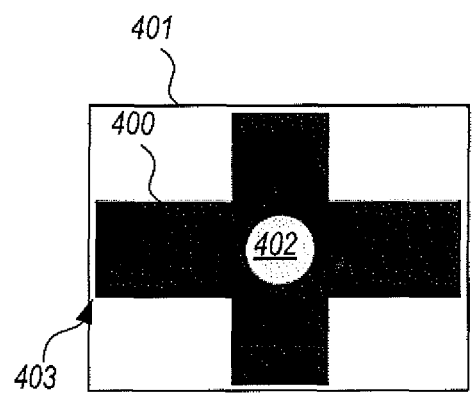
FIG. 4B is an image of the design of FIG. 4A after the visible image content has been reduced by approximately two percent.

To illustrate how the stroking process of FIG. 3 operates, FIG. 4A illustrates an example image container 401 containing visible image content in the form of a dark cross shape 400 with a transparent circle 402 in the center. In this illustration, the ends of the cross shape 400 abut the edges of the image container 401. As shown in FIG. 4B, after shrinking the visible image content 400 only and not the image container 401 itself, the image container 401 remains the same size and shape, but the cross shape 100 is slightly smaller (e.g., such that there is only a barely visible difference). The result is a transparent area 403 around the entire visible image content 400. The amount of shrinkage is sufficient to provide sufficient transparent area in the image container to add a visible stroke effect along every edge of the visible image content. If the visible image content 400 is not reduced, then a visible stroke cannot be added along the edges of the ends of the cross that abut the edges of the image container. Importantly, in order to retain substantially the same visual aspects of the visible image content, the visible image content 400 is reduced by only a small amount, for example, 1 to 5%. Of course, the stated amount of reduction is not intended to be limiting and could be more (or less), and the example amount is illustrated herein only to give the reader an idea of what might allow the image to be visually perceptible against a non-contrasting background while still retaining the essential visual aspects of the original visible image content.

FIG. 4B illustrates the image container 401 after the visible image content 400 has been reduced by approximately 2% (while maintaining the aspect ratio of the visible image content 400). As illustrated, the edges of the ends of the cross shape 400 are now pulled back from the edges of the image container 401 (by several pixels) such that some transparent area 403 separates all the outer edges of the visible image content 400 from the edges of the image container 401.

Figure 4C:
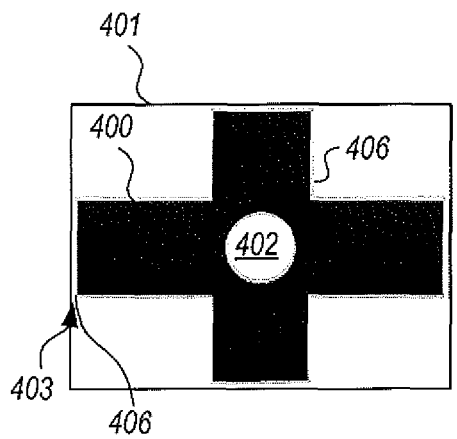
FIG. 4C is an image of the design of FIG. 4A after a line stroke has been applied to the edges of the reduced visible image content of FIG. 4B.
Figure 4D:
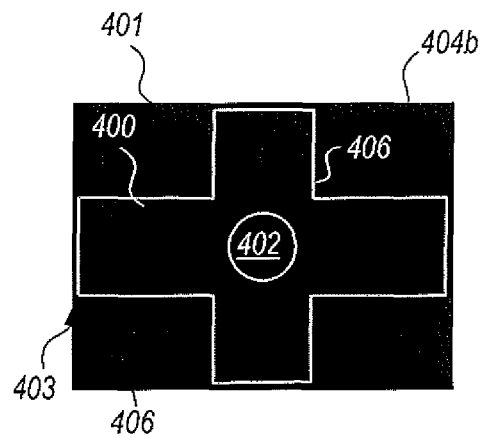
FIG. 4D is an image of the image of FIG. 4D when overlaid on a dark background.

FIG. 4C illustrates the image container after a light-colored stroke (e.g., light gray) 406 has been applied to the visible image content 400 in the image container 401. Note that because the original visible image content 400 was reduced in FIG. 4B, there is room for adding the stroke 406 even along the edges of the ends of the cross so that that the stroke is visually perceptible around all edges of the visible image content 400. FIG. 4D illustrates the stroked image when placed over a dark background 404b. As illustrated, because the edges of the visible image content has been stroked with a light color (e.g., light gray), the edges of the visible image content are therefore visible when the image content is placed over a dark (or other non-contrasting color) background.

Figure 5:
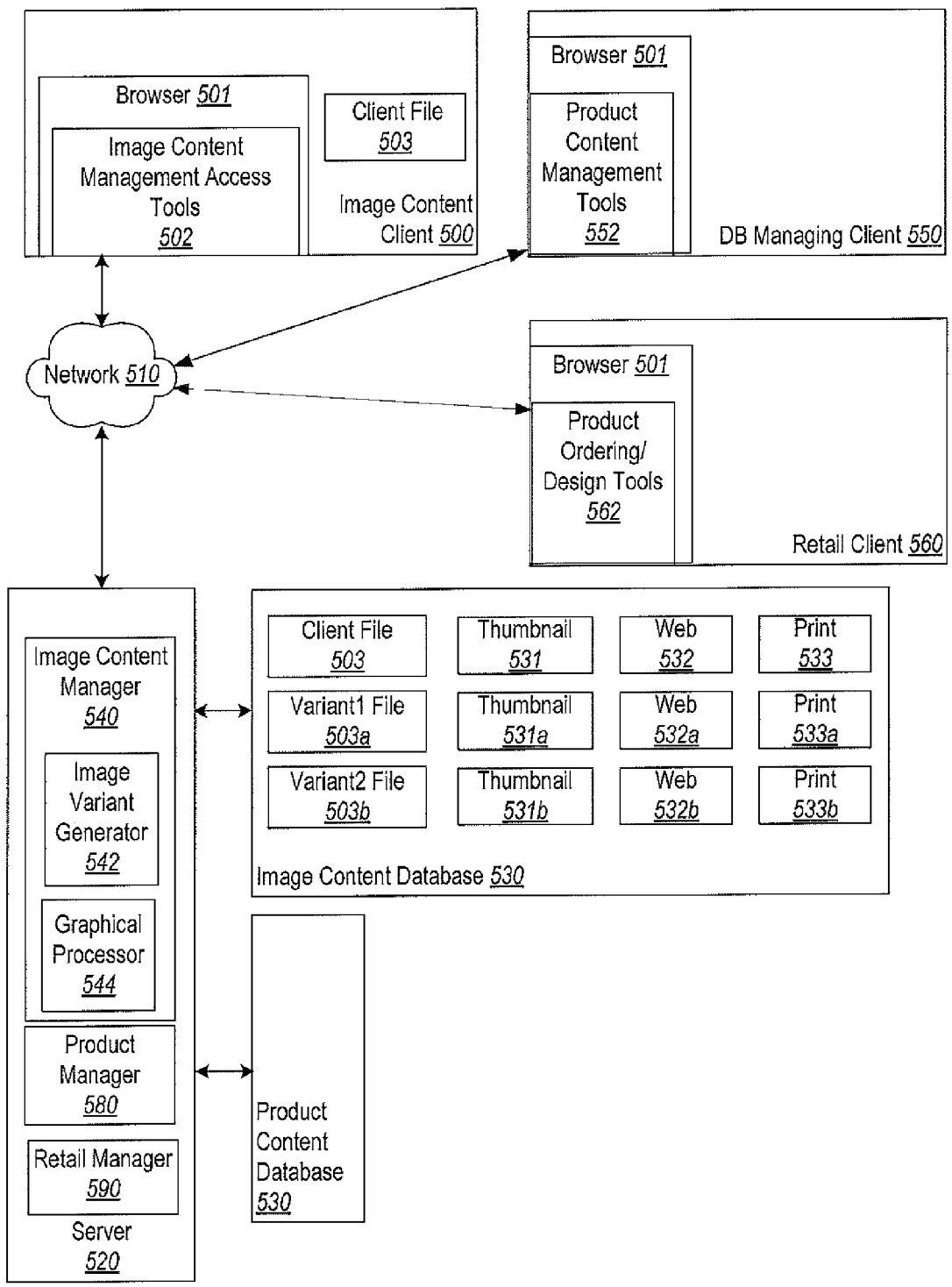
FIG. 5 is a block diagram of an image content management system.

FIG. 5 is a block diagram of an exemplary embodiment of an image content management system 500 in which the image variant generator 200 may be employed. Referring to FIG. 5, a networked server 520 executes image content management software 540 which manages image content stored in an image content database 530. In a preferred embodiment, server 520 is a typically equipped computer system including a processor, program and data memory/storage, input and output devices, and network communication devices. While shown in FIG. 5 as a single unit, it will be understood that server 520 may in fact be comprised of a plurality of individual processors or computers, data storage units, and other equipment, which may be either in the same or in different geographical locations, operating cooperatively so as to provide image content management access to networked users.

The image content management software 540 may be accessed by an image content management access tool 502 executing on a user's computer system, hereinafter referred to as client 500. In a preferred embodiment, client 500 is a typically equipped PC or similar computer, but it will be understood that the invention can be employed with other client devices, for example devices capable of running browser software, such as palmtop computers, tablet computers and web-enabled telephones. Furthermore, the client and server may execute on a single computer or within a single standalone program which does not require the network 510. A single representative client 500 is shown and discussed for illustration, but it will be understood that a number of geographically dispersed clients of different types can be simultaneously in various stages of interaction with server 520 via network 510. Network 510 is preferably the Internet, or World Wide Web, but could alternatively be any intranet, extranet, or other network.

Figure 6:
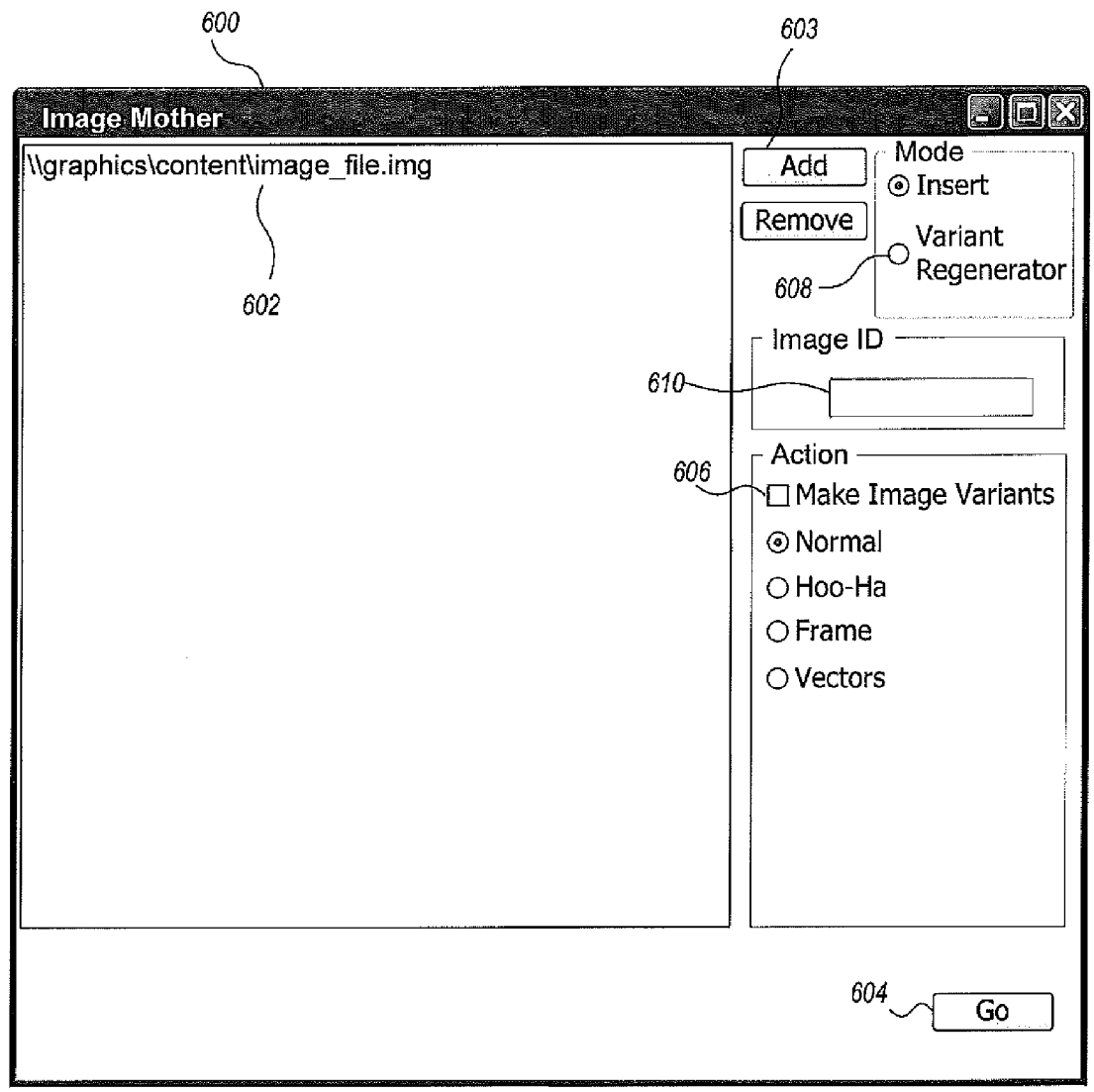
FIG. 6 is an image of a screen presented to a user of the image content management access tool.
Figure 7:
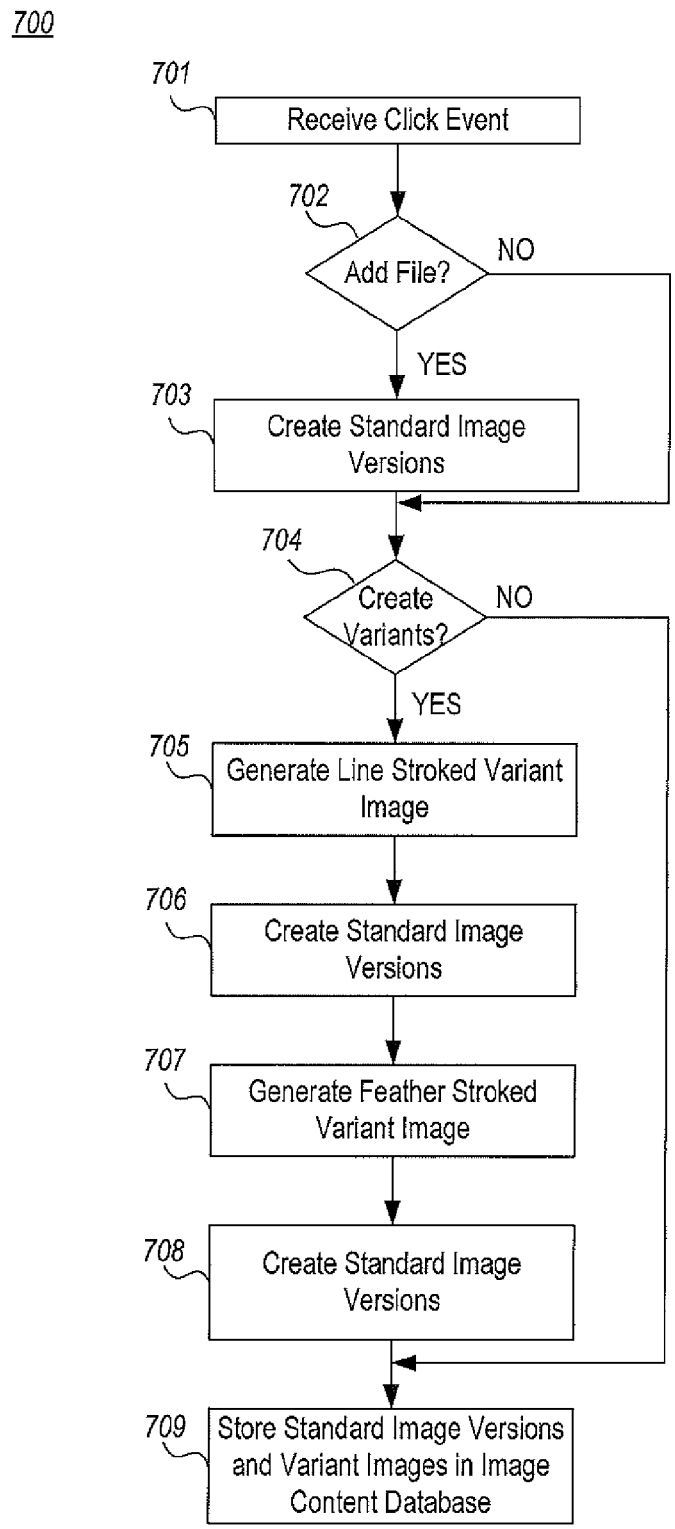
FIG. 7 is a flowchart of a method performed by image content manager software.

FIG. 6 is an exemplary embodiment of a graphical user interface screen 600 generated by the image content management access tool 502 displayed to a user on the client 500 display. In the illustrative embodiment, the image content management software 540 is used to create, store, and otherwise manage a database of images usable in various contexts. For example, a web site that offers products that may be customized to incorporate an image selected from a library of images may require several versions of each image for use in different contexts including a high-quality full-size display image for display on a user's display when selected by a user, a low-quality thumbnail image for display on a user's display when presenting a plurality of images that may be selected by the user, and a print-quality image for use when printing the image onto a product. In the illustrative embodiment, the image content management software 540 is designed to automatically create these different versions of an image, called the "standard" image versions when an image is uploaded and added to the image content database 530. While the image content database 530 is depicted as a single block, it will be understood that image content database 530 represents a virtual area of addressable memory that may exist on one or more physical data storage devices. It is not required that client file 503, thumbnail 531, web 532 and print 533 files be stored in contiguous memory locations or on the same hardware device.

As shown in FIG. 6, the image content management access tool 502 provides a file upload feature for adding images to the image content database 530. In a preferred embodiment, the user initiates the file upload option and automatic creation of the standard image set by clicking a button having a descriptive legend, such as "Add". A drop down menu or other well-known selection technique could be alternatively employed.

The screen 600 provides name field 602 for the user to enter the name of the desired file. Alternatively, the user may initiate a search in the client 500 file system for the desired file by clicking "Add" button 603, which pops a Browse dialog to allow the user to browse and locate an image file. When the desired file 503 has been located, the user initiates the upload to server 520 by clicking "Go" button 604. For the purpose of this discussion, file 503 is depicted as residing on client 500, but it will be understood that the file could reside on and be retrieved from another computer system or storage device that is accessible by client 500. The operation and features of the file upload screen 600 are implemented using well-known graphical user interface capabilities.

Image content management software 540 includes a graphical processor 544 capable of modifying an image, and an image variant generator 542. The image content management software 540 is in communication with image content database 530. No specific hardware system or structure is required to implement the image content manager 540. For example, while the image content manager 540 (including the image variant generator 542 and graphical processor 544) may be entirely executed on a single computer, the image content manager 540 may be implemented as a number of different modules which may be executed across multiple cooperating computers or processors. The number of computer systems employed in a specific embodiment of the system would typically be a function of factors such as system workload, processing power of the hardware employed, operating system constraints, and the level of hardware redundancy desired. In one embodiment, the graphical processor 544 comprises an image editing program such as Adobe PhotoShop® or Adobe Illustrator® from Adobe Systems, Inc.

Returning to FIG. 6, when the user has selected the desired file and indicated that the user wants the file to be uploaded by clicking "Go" button 604, browser 501 (FIG. 5) will locate and forward the requested client file 503 to the image content management software 540 at the server 520.

Upon upload of a client file 503, the image content management software 540 utilizes the graphical processor 544 to generate the standard image set of image files, including three versions of uploaded client file 503, identified in FIG. 5 as thumbnail 531, web 532 and print 533. These can be thought of as relatively low resolution, medium resolution and high resolution versions of the client file. Thumbnail 531 and web 532 are preferably RGB images designed for viewing on the client 500 display at a typical resolution of 72 pixels per inch. Thumbnail 531 is a relatively small image intended for quick file identification and selection. In a preferred embodiment, thumbnail 531 is sized to be 100 pixels in the longest dimension. Web 532 is a larger version showing the file image in greater detail. Thumbnail 531 and web 532 will typically be stored in JPEG format or, if transparency support is required, in GIF format. In the illustrative embodiment, print 533 file is the CMYK version of the client file 503 intended for use in the subsequent printing process, and not for viewing by the user of client 500. Print 533 is stored in PDF format at a resolution of 300 dpi. Other versions, for example versions of different size or resolution may also be generated and included in the set of standard image files by the image content management software 540. management software 540 determines whether the click event is an "Add" image event (step 702), for example as generated when a user clicks on the "Go" button 604 in the graphical user interface screen 600 of FIG. 6. If the click event is an "Add" image event, the image content management system 540 creates the standard image versions (such as Web 531, Thumbnail 532, and Print 533) corresponding to the selected file 503. When this action is complete, or if the click event was not an "Add" event, the image content management software 540 checks to see if the "Make Image Variants" checkbox 606 was clicked, or if the click event was due to the user clicking on the "Variant Regenerator" radio button 608 (step 704). If so, the image content management software 540 generates a line stroked variant image 503a of the original image 503 (step 705), and then creates standard image versions 531a, 532a, 533a for the variant (step 706). The image content management software 540 then generates a feather stroked variant image 503b of the original image 503 (step 707), and then creates standard image versions 531b, 532b, 533b for the variant (step 708). All images are then stored in the image content database 709. Later, when an image is selected from the image content database for display or printing on a low-contrast background, one of the variant images of the selected image may be displayed or printed in place of the selected image.

Referring back to FIG. 5, a product database manager using a DB managing client computer 550 may manage the products and images associated with the products using one or more product content management tools 552. The server system may be in communication with a product database 530, which stores images of products and associations between products and various images from the image content database 530.

Figure 8:
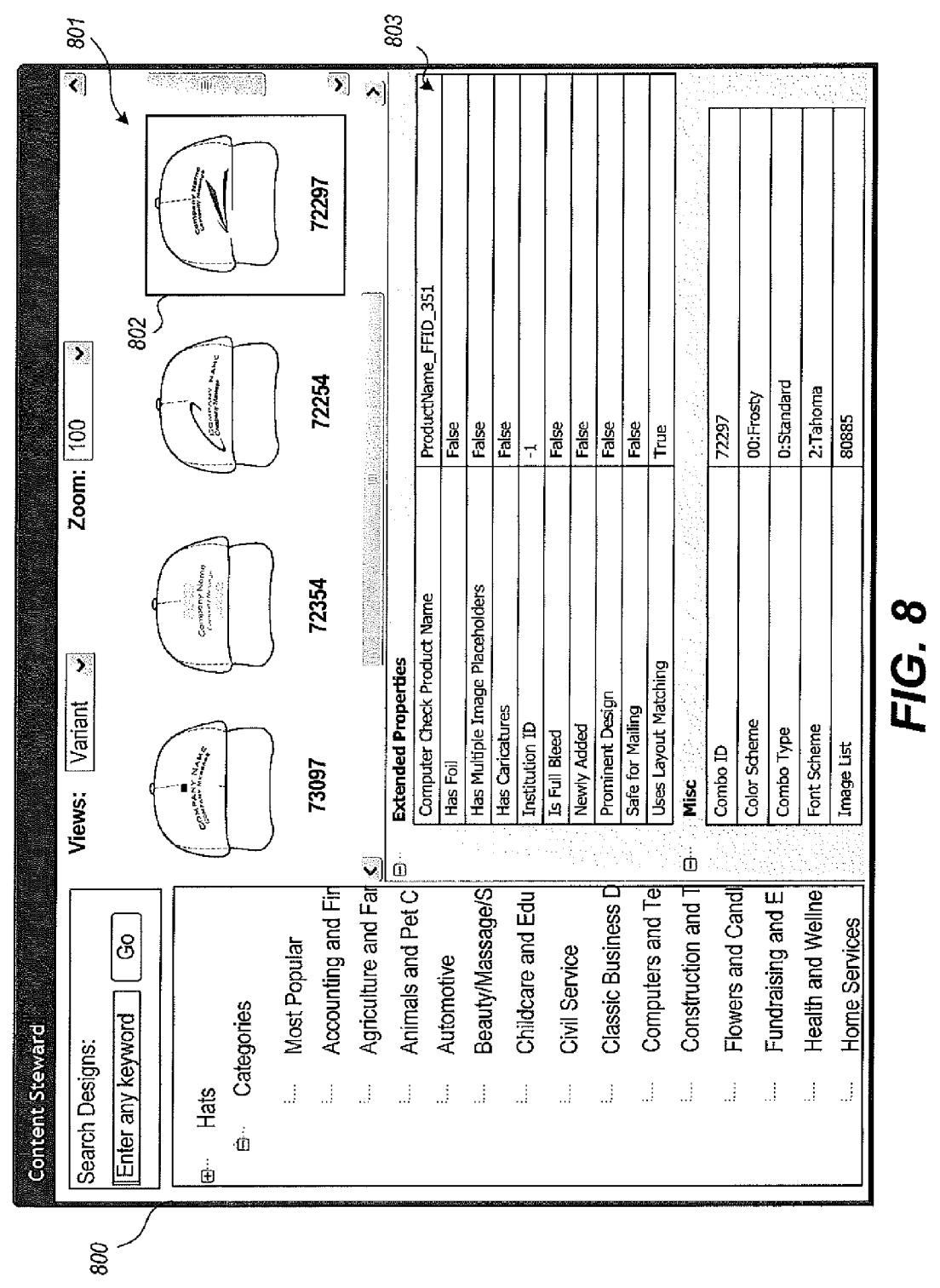

FIG. 8 is an illustrative embodiment of a display screen window 800 generated by the product content management tools 552 which allow a product content manager to select products and design images and assign which image or variant image is to be displayed and/or produced with a corresponding product. For example, window 800 displays a gallery 801 of images of a hat product, each hat offered with a different design. The database manager may select a product, for example, the hat product indicated at 802. The window 800 may include a properties pane 803 which displays properties and associated values assigned to the selected product 802. For example, the properties may display the color scheme and font scheme of the selected product design.

Figure 9A:
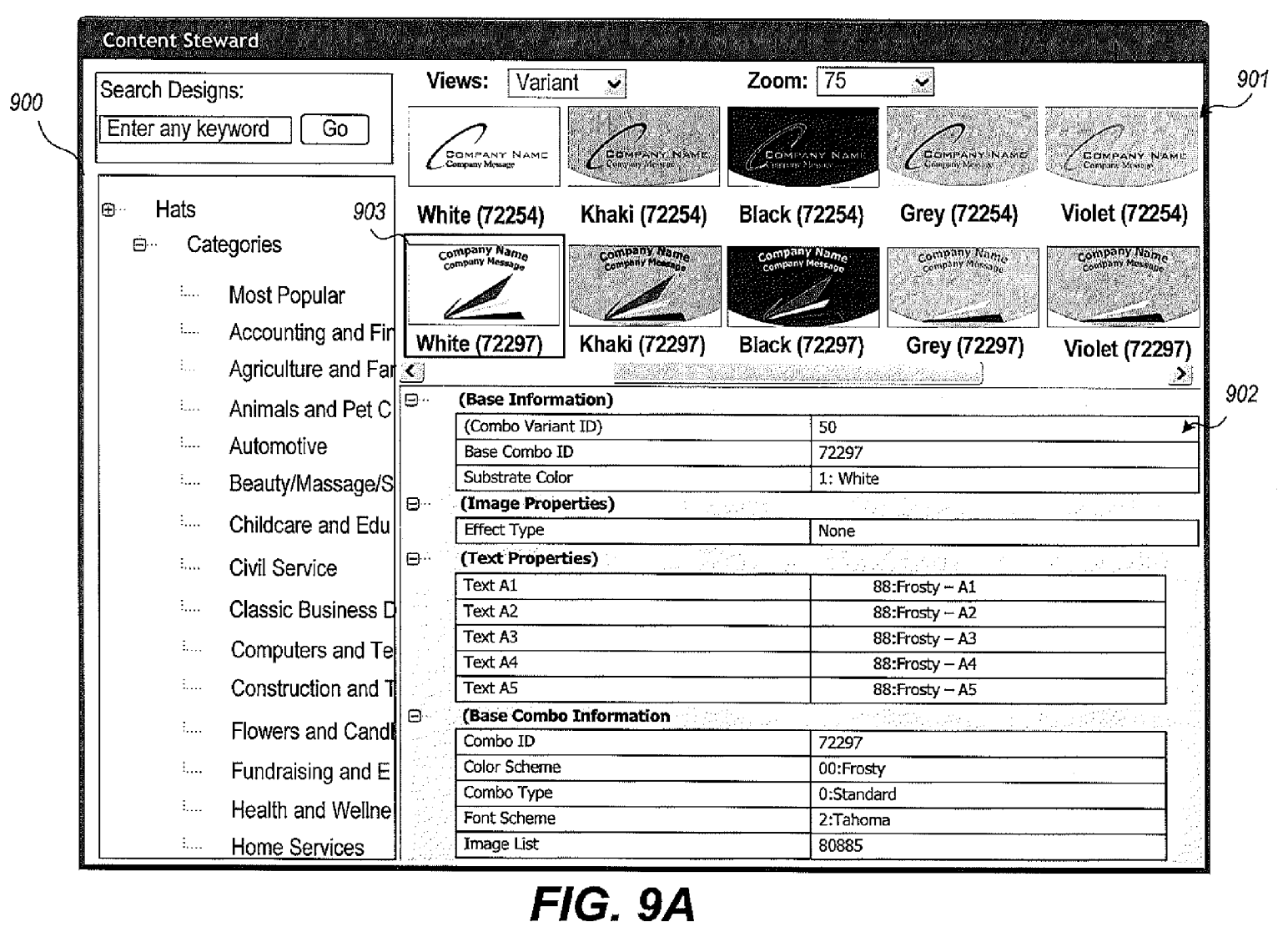

The database manager may double-click on the selected product 802 to bring up an image window 900, shown in FIG. 9A, which includes an image variant gallery 901 displaying the current image or variant of the image associated with each color of the offered product. For example, the bottom row of designs illustrates a given design and its variant images against various background substrates. A properties pane 902 may be displayed which displays properties of the image, such as the image ID, the substrate (background) color, the color scheme, the text colors, etc. When a particular image is selected, for example as indicated at 903, the values of the properties associated with the selected image are displayed in the properties pane 902. The database manager may edit these properties as desired.

Figure 9B:
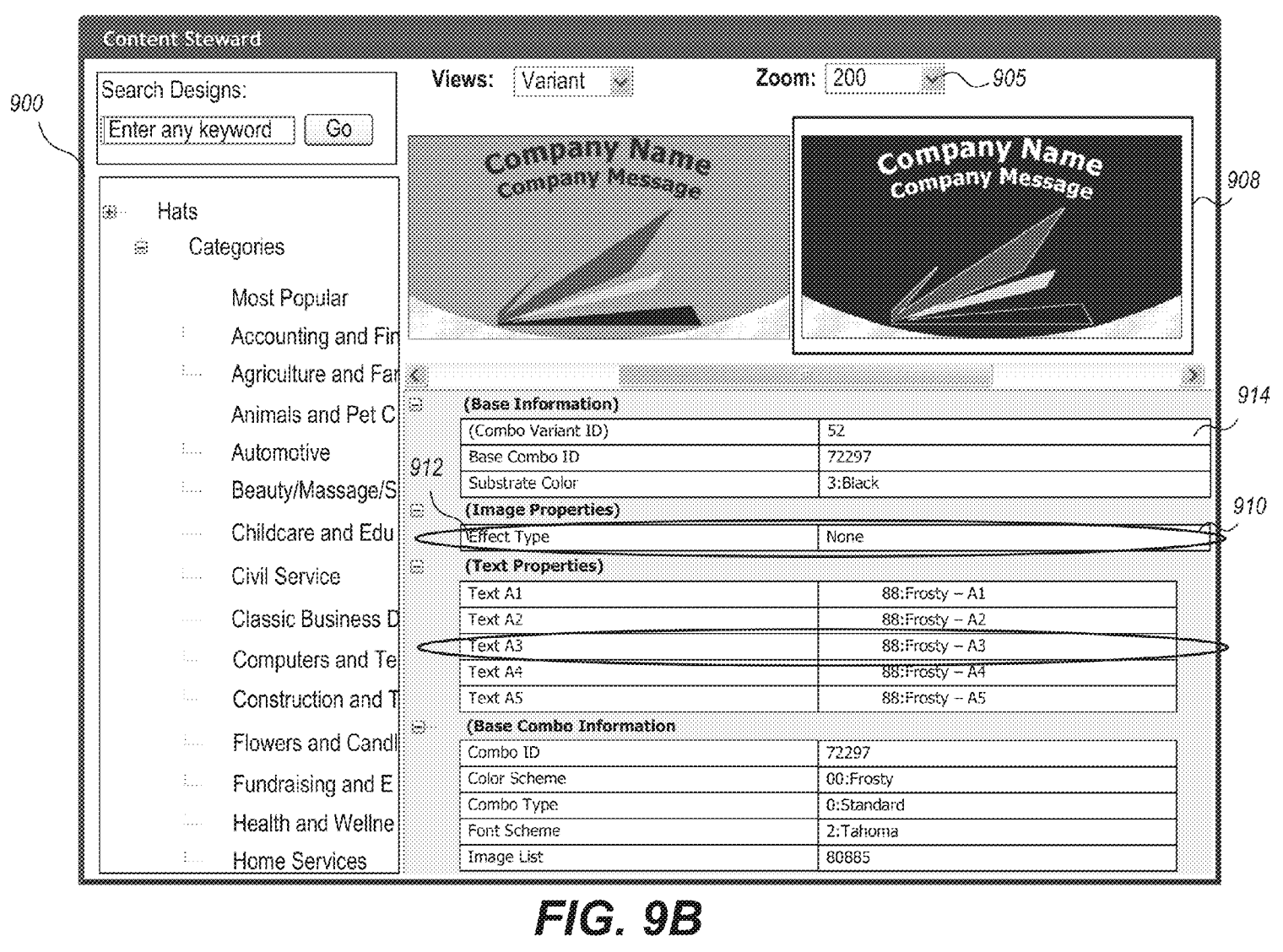

The image gallery 901 may be scrolled through using scrollbar 904 or arrow keys on the keyboard, and zoomed using zoom tool 905. FIG. 9B illustrates the window 900 when the image variant for the black substrate (indicated as 908) is selected. As shown, the image properties 910 include an Effect Type property 912, which is set to a Feather Stroke effect. The feather stroked variant image of this particular design image is thus associated with product/design/color combination ID 914 so that when the product/design/color combination is selected in a website by a customer, the Feather Stroke variant of the base design is selected for display and production.

The database manager may edit the properties for any product/design combination. For example, if the database manager wishes to select a different variant for a given product/design/color combination, such as a Hard Stroke variant image, the database manager may set the value of the Effect Type 912 in the Image Properties 910 of the selected combo to the file corresponding to the Hard Stroke variant image for the selected design.

Returning to FIG. 5, a customer visiting a website offering products may access the server on a computer system such as retail client 560. The retail client may have one or more product ordering/design tools 562 executing in the browser 501 of the retail client 560. Product ordering/design tools 562 allow a user to view, select, customize, and order products offered at the website.

Figure 10:
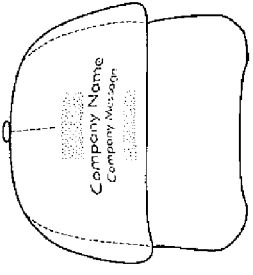
FIG. 10 is an image of a screen presented to a user of the product ordering/design tools.
Figure 11:
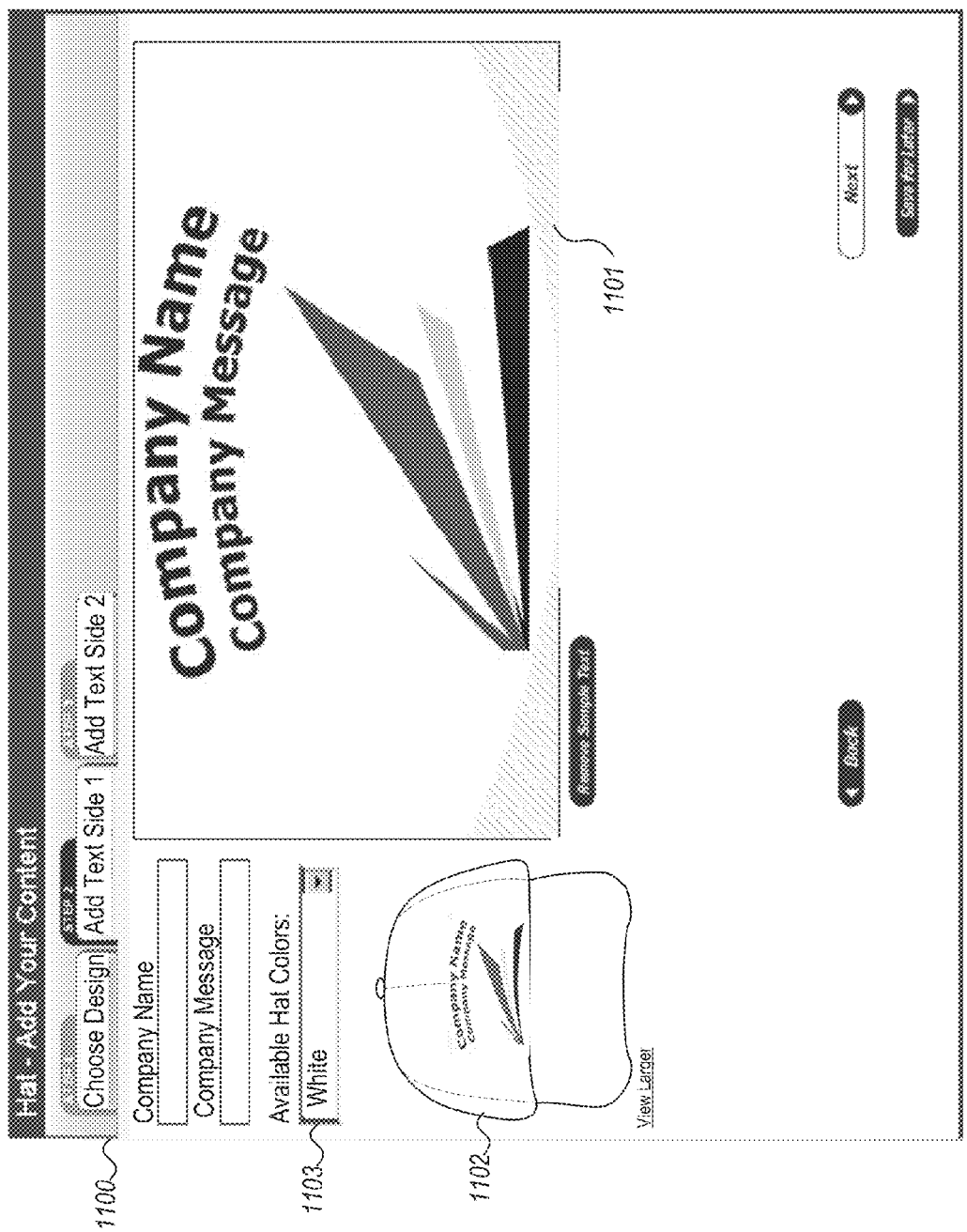
FIG. 11 is an image of a screen presented to a user of the product ordering/design tools upon user selection of a product.

FIG. 10 shows an example window 1000 that may be presented by the product ordering/design tools 562. Window includes a gallery of products with different images shown thereon. FIG. 11 shows an example window 1100 that may be presented upon user selection of product 1001. The window 1100 includes an image 1101 of the design to be printed on the product and a product image 1102 showing what the actual product will look like. The image window 1100 also includes a selector 1103 for selecting an alternate color of the product. For example, the white hat may alternatively be switched out for a tan, gray, red, navy, or black hat.

Figure 12:
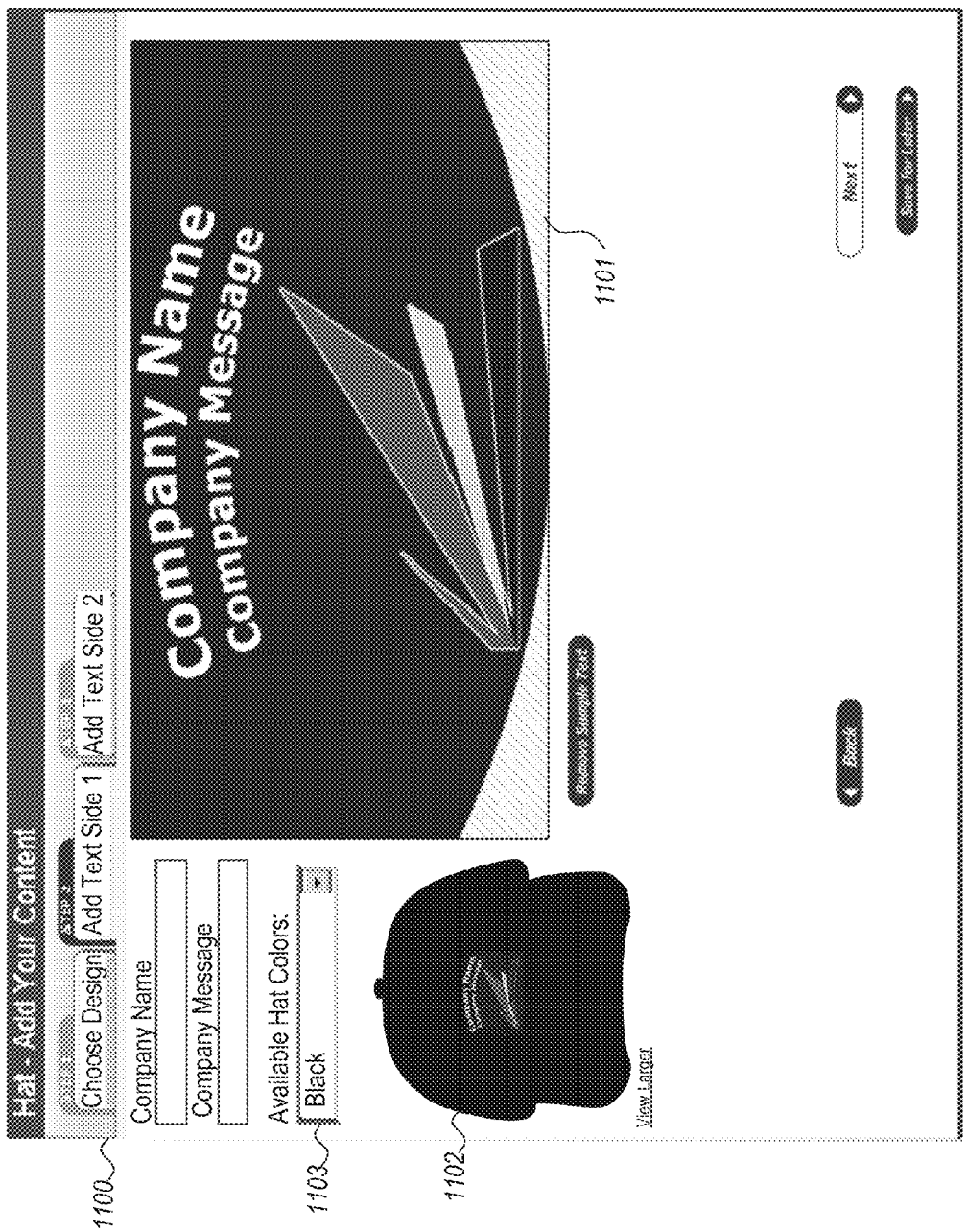
FIG. 12 is an image of a screen presented to a user of the product ordering/design tools upon user selection of an alternative substrate color.

FIG. 12 shows the window 1100 after selection of the black color on the selector 1103. As illustrated, the image associated with the black substrate color of the product is a stroked image, i.e., a variant image of that associated with the white product. In the database of FIGS. 9A-9C, the image shown is pulled from the database 530 based on the value in the Effect Type property field 912. As also shown, the product image 1102 is updated with the black hat color and the stroked image variant design image.

While an exemplary embodiment of the invention has been discussed, the described embodiment is to be considered as illustrative rather than restrictive. The scope of the invention is as indicated in the following claims and all equivalent methods and systems.

What is claimed is:

1. A computer-implemented method for adding a stroke around image content in an image container of an electronic document, the image container characterized by a height dimension and a width dimension, and having visible image content characterized by predefined content edges, the method comprising
    shrinking, automatically by one or more processors, the visible image content contained within the image container such that no portion of the visible image content abuts a boundary of the image container, while maintaining an original size of the image container;
    selecting, automatically by one or more processors, the predefined content edges;
    determining, automatically by one or more processors, a stroke width based only on a smaller dimension of the height dimension and the width dimension of the image container; and
    adding, automatically by one or more processors, a stroke characterized by the stroke width around the predefined content edges to produce a variant image comprising the shrunken visible image content and added stroke.

2. The method of claim 1, wherein the step for shrinking the image includes maintaining the aspect ratio of the visible image content.

3. The method of claim 1, wherein the stroke is characterized by a color that contrasts with a background color of the visible image content.

4. The method of claim 1 wherein the stroke comprises a line effect.

5. The method of claim 1 wherein the stroke comprises a feathered effect.

6. The method of claim 1, wherein the variant image is automatically combined, by one or more processors, with an image of a product to produce an image of a customized product incorporating the variant image.

7. The method of claim 6, further comprising:
    displaying, by one or more processors, the customized product image.

8. The method of claim 1, further comprising:
    displaying, by one or more processors, the variant image on a background characterized by a color that contrasts with the stroke color.

9. The method of claim 1, further comprising:
    printing the variant image to produce a product incorporating the variant image.

10. The method of claim 1, wherein the variant image is printed on a product having a background color that contrasts with the color of the stroke.

11. A computer-implemented method for adding a stroke around image content in an image container of an electronic document, the image container characterized by a height dimension and a width dimension, and having visible image content characterized by predefined content edges, the method comprising:
- determining, automatically by one or more processors, whether any of the visible image content abuts any edge of the image container;
- if it is determined that any of the visible image content abuts any edge of the image container, shrinking, automatically by one or more processors, the visible image content contained within the image container such that no portion of the visible image content abuts a boundary of the image container, while maintaining an original size of the image container;
- selecting, automatically by one or more processors, the predefined content edges;
- determining, automatically by one or more processors, a stroke width based only on a smaller dimension of the height dimension and the width dimension of the image container; and
- adding, automatically by one or more processors, a stroke characterized by the stroke width around the predefined content edges to produce a variant image comprising the shrunken visible image content and added stroke,
- wherein the size of the variant image is such that the variant image is accommodated within the image container.

12. An apparatus for adding a stroke around image content in an image container of an electronic document, the image container characterized by a height dimension and a width dimension, and having visible image content characterized by predefined content edges, the apparatus comprising
- one or more processors configured to automatically shrink the visible image content contained within the image container such that no portion of the visible image content abuts a boundary of the image container, while maintaining an original size of the image container, the one or more processors further configured to automatically select the predefined content edges and automatically determine a stroke width based only on a smaller dimension of the height dimension and the width dimension of the image container, and automatically add a stroke characterized by the stroke width around the predefined content edges to produce a variant image comprising the shrunken visible image content and added stroke.

13. The apparatus of claim 1, wherein the one or more processors are configured to maintain the aspect ratio of the visible image content when shrinking the visible image content.

14. The apparatus of claim 1, wherein the stroke is characterized by a color that contrasts with a background color of the visible image content.

15. The apparatus of claim 1 wherein the stroke comprises a line effect.

16. The apparatus of claim 1 wherein the stroke comprises a feathered effect.

17. The apparatus of claim 1, wherein the one or more processors are configured to automatically combine the variant image with an image of a product to produce an image of a customized product incorporating the variant image.

18. The apparatus of claim 17, further comprising:
a display which displays the customized product image.

19. The apparatus of claim 1, further comprising:
a printing system which prints the variant image to produce a product incorporating the variant image.

20. The apparatus of claim 19, wherein a background color of the product on which the variant image is printed contrasts with the color of the stroke.

* * * * *

UNITED STATES PATENT AND TRADEMARK OFFICE
CERTIFICATE OF CORRECTION

PATENT NO. : 8,810,603 B2
APPLICATION NO. : 12/021083
DATED : August 19, 2014
INVENTOR(S) : Jay T. Moody et al.

Page 1 of 1

It is certified that error appears in the above-identified patent and that said Letters Patent is hereby corrected as shown below:

In the Claims

Column 12

In Claim 13, please delete "1" and insert --12--.

In Claim 14, please delete "1" and insert --12--.

In Claim 15, please delete "1" and insert --12--.

In Claim 16, please delete "1" and insert --12--.

In Claim 17, please delete "1" and insert --12--.

In Claim 19, please delete "1" and insert --12--.

Signed and Sealed this
Twenty-fourth Day of May, 2016

Michelle K. Lee
*Director of the United States Patent and Trademark Office*